United States Patent
Mank

(12) 
(10) Patent No.: US 6,309,775 B1
(45) Date of Patent: Oct. 30, 2001

(54) PRISMATIC ELECTROCHEMICAL CELL

(75) Inventor: Richard M. Mank, Weymouth, MA (US)

(73) Assignee: Duracell Inc., Bethel, CT (US)

( * ) Notice: Subject to any disclaimer, the term of this patent is extended or adjusted under 35 U.S.C. 154(b) by 0 days.

(21) Appl. No.: 09/022,561

(22) Filed: Feb. 12, 1998

(51) Int. Cl.$^7$ .................................................. H01M 2/00
(52) U.S. Cl. ........................................................ 429/122
(58) Field of Search ............................. 429/176, 223, 429/231.3, 129, 136, 140, 163, 122

(56) References Cited

U.S. PATENT DOCUMENTS

| | | |
|---|---|---|
| 224,328 | 2/1880 | Converse . |
| 702,544 | 6/1902 | Delafon . |
| 733,949 | 7/1903 | Drawbaugh . |
| 2,980,747 | 4/1961 | Daley . |
| 3,037,066 | 5/1962 | Grieger et al. . |
| 4,636,445 | 1/1987 | Yamano et al. . |
| 4,935,318 | 6/1990 | Ikoma et al. . |
| 5,244,758 * | 9/1993 | Bronoel et al. ........................ 429/223 |
| 5,318,861 * | 6/1994 | Harats et al. .............................. 429/21 |
| 5,405,719 | 4/1995 | Sonoda et al. . |
| 5,707,764 * | 1/1998 | Miyamoto et al. ................... 429/223 |
| 5,744,259 | 4/1998 | Ohta et al. . |
| 5,787,943 | 8/1998 | Aladjov . |
| 5,865,874 | 2/1999 | Trainer . |
| 6,007,946 * | 12/1999 | Yano et al. ............................ 429/223 |
| 6,099,991 * | 8/2000 | Inagaki et al. ........................ 429/235 |

FOREIGN PATENT DOCUMENTS 83520   7/1948   (NO) .

* cited by examiner

Primary Examiner—Gabrielle Brouillette
Assistant Examiner—M. Wills
(74) Attorney, Agent, or Firm—Fish & Richardson P.C.

(57) ABSTRACT

A sealed, prismatic electrochemical cell has an electrode plate comprising a porous structure with a maximum linear dimension of the porous structure in the principle direction of ion flow of at least 20 percent of the maximum linear dimension of the housing cavity in the principle direction of ion flow. The cell can produce good current density while having a high capacity. The electrode construction can result in a low diffusion polarization despite the thickness of the electrode. The overall cell can be economically manufactured, and has a low percentage of its internal volume occupied by inactive materials. Electrode plaque constructions and active material compounds are also disclosed.

43 Claims, 6 Drawing Sheets

100nm

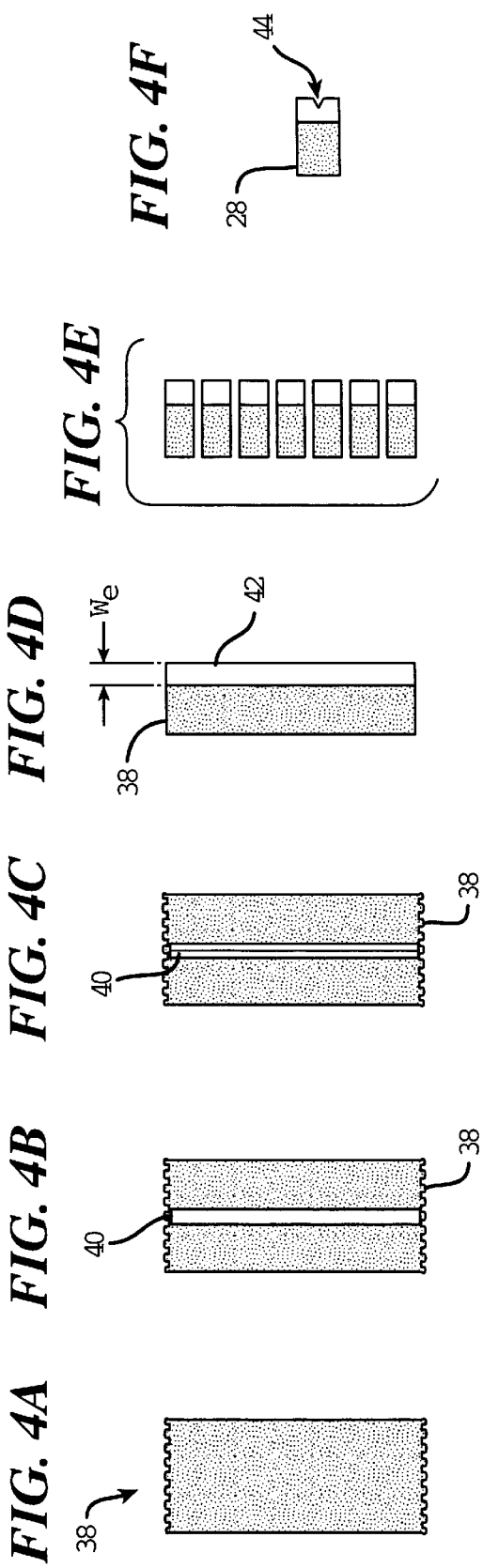

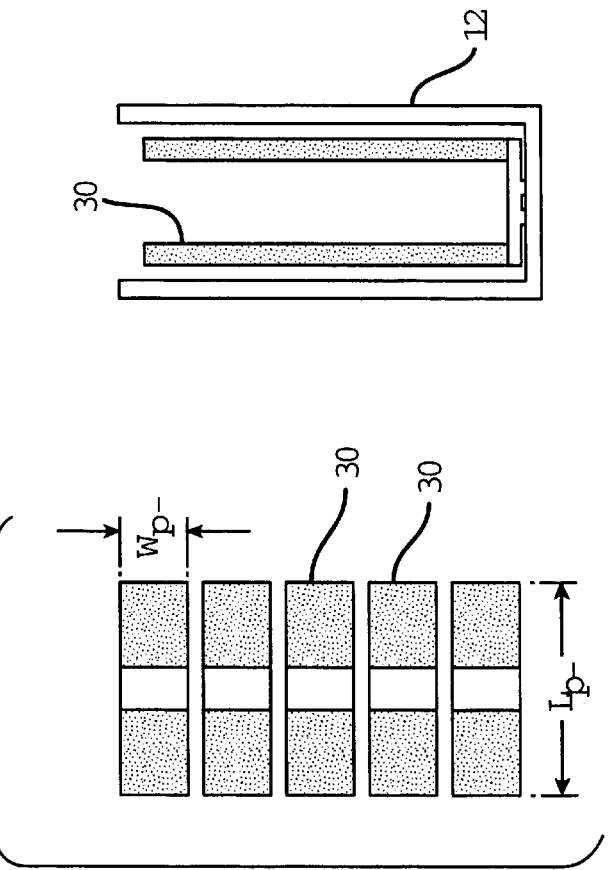
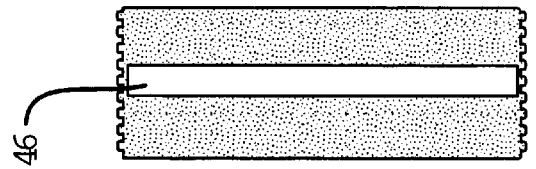
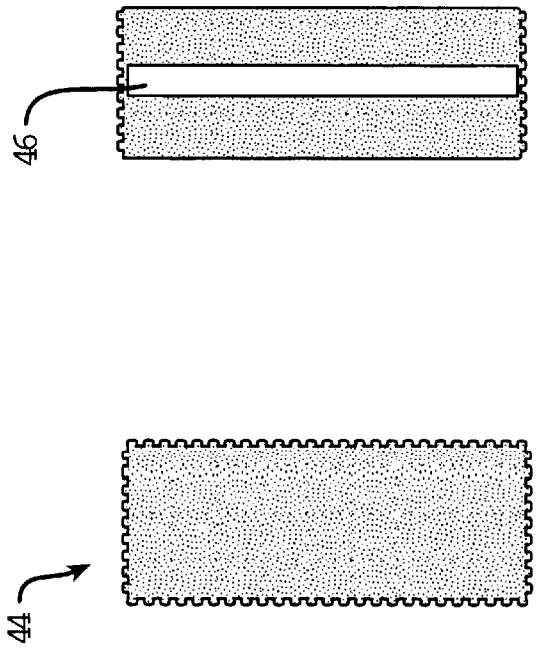

PRISMATIC ELECTROCHEMICAL CELL

BACKGROUND OF THE INVENTION

The present invention relates to sealed, prismatic electrochemical cells.

Cylindrical electrochemical cells have a cylindrical housing. Some cylindrical cells contain a roll of thin, flexible electrodes wound up together with a separator layer in between them. This cell construction is sometimes called a "jelly roll", due to the wound configuration of the electrode and separator components. The electrodes of such cells can be made by impregnating porous, sintered metallic plaque substrates with active material, or by applying a paste containing active material onto a metallic substrate. Some other cylindrical cells contain pressed active material powder pellet electrodes arranged in concentric cylinders within the housing, with a separator tube between the opposing electrodes. Cylindrical cells can be relatively inexpensive to make, and the cylindrical shape of the can resists stress concentrations and deformation from internal pressure changes. Standard size AA and A nickel cadmium (NiCd) and nickel metal hydride (NiMH) batteries are examples of wound-type cylindrical cells. Standard AA, C and D alkaline batteries are examples of bobbin-type (pellet) cylindrical cells.

Prismatic cells, cells with housings with polygonal side walls (such as parallelepiped or rectangular housings), are found in many applications requiring high power densities, as their shape can provide high volumetric stacking efficiency in battery packs, such as for cellular phones, for instance. A typical F6 nickel metal hydride prismatic cell has three nickel hydroxide positive electrode plaques sandwiched between four metal hydride alloy negative electrode plaques, with separator bags isolating each plaque layer from the next. This electrode stack is inserted into a rectangular metal can, with all of the negative electrode plaques connected to one terminal through a series of metallic tab strips, and all of the positive electrode plaques connected through a series of tab strips to the other terminal. Each of the metallic tab strips is sufficiently insulated to prevent internal shorting between electrode components. Generally, the can itself is one of the two terminals. Prismatic cells are generally more complex and expensive than comparable cylindrical cells, due to the larger number of internal components and attendant assembly operations.

Two important performance characteristics for a battery are its overall capacity (expressed in amp-hours) and its discharge efficiency at a given discharge rate. The rated capacity is a measure of the total amount of usable energy stored in the cell, and relates to the number of hours the cell can power a given load. Capacity is primarily a function of the amount of reactable active material contained within the cell, particularly the amount of whichever active material is first consumed. Typically, cell capacity is measured at a C/5 discharge rate, as described in ANSI C18.2M-1991, published by the American National Standards Institute. The theoretical volumetric capacity of a single electrode is the total energy density of the active material contained within a given volume of the electrode, and can be expressed in ampere-hours per liter. Discharge rate efficiency is affected by the amount of interfacial surface area between the electrodes, and the subsequent degree of polarization which tends to reduce output voltage as the discharge rate increases. The more the interfacial surface area, the higher the discharge rate maintainable above a given voltage, as the discharge rate can be seen as a maximum current per unit of interfacial surface area (current density). A standard nickel metal hydride F6 cell, for instance, may have a total of 32 or more square centimeters of interfacial area between the stacked electrodes.

Polarization, which generally refers to the difference in the open circuit and closed circuit load voltage of the cell, is a function of the current density and consists of three separate terms: activation polarization, ohmic polarization, and concentration polarization. Activation polarization reduces the load voltage at a given load, and is an inherent function of the properties of the active materials chosen for the cell. Ohmic polarization also reduces the load voltage at a given rate due to the collective resistance contributions of the individual cell components, connections and interfaces, and can be reduced by lowering the resistivity of the individual cell components and interfaces. Concentration polarization reduces the load voltage due to diffusion rate limitations of charged ions in and out of the electrode plaques at the interface of the electrolyte and electrode surface, and can be reduced by improving the electrode reaction efficiency which in turn enhances the diffusion rate of charged ions within the electrode.

If the capacity of the cell is governed by the amount of active material in the positive electrode, the cell is said to be of a positive electrode-limited type. Cells which are designed to consume the negative active material first are called negative electrode-limited. Typical nickel-metal hydride cells, for instance, are positive electrode-limited to reduce the chance of overpressurization if the cell is overcharged. As the cell is charged, oxygen is generated on the surface of the nickel hydroxide positive electrode and subsequently reduced by the metal hydride negative electrode. If the positive electrode is not charged up before the negative electrode, hydrogen gas can form at the negative electrode, resulting in high internal pressure. A typical ratio of negative-to-positive capacity is more than 1.6. In other words, a 650 milliampere-hour cell will typically contain enough negative active material (e.g., metal hydride alloy) to store 1040 milliampere-hours of energy. Some of this excess negative capacity is lost due to corrosion of the metal hydride alloy in the cell environment over the life of the cell.

SUMMARY OF THE INVENTION

The invention features a sealed prismatic electrochemical cell with electrodes having porous structures filled with active material.

According to one aspect of the invention, the sealed electrochemical cell includes a prismatic housing defining an internal cavity, a negative electrode plate disposed within the housing cavity and in electrical communication with the housing, and a positive electrode plate having a porous structure disposed within the housing cavity. The porous structure is electrically isolated from the housing and the negative electrode plate, and defines a principle direction of ion flow. The maximum linear dimension of the porous structure in the principle direction of ion flow is at least 20 percent (preferably at least 30 percent, more preferably at least 40 percent, and most preferably between about 52 and 56 percent) of the maximum linear dimension of the housing cavity in the principle direction of ion flow.

In some embodiments, the overall external dimension of the housing, measured in the principle direction of ion flow, is between about 2 and 8 millimeters (preferably between about 4 and 6 millimeters, and more preferably about 5.6 millimeters).

The porosity of the porous structure of the positive electrode plate is preferably between about 30 and 40 percent (more preferably between about 34 and 36 percent).

In some embodiments, the positive electrode plate includes an active metallic hydroxide compound containing nickel and from zero to about four percent (in some cases, about two percent and in some other cases about 0.5 percent), by weight, cobalt. The cobalt may be in the form of cobalt oxide, the weight of the cobalt oxide being between about 0.03 and 0.10 times the weight of the active metallic hydroxide compound. The active metallic hydroxide compound preferably further contains from zero to about eight percent (more preferably between about 4 and 6 percent, most preferably about 5 percent), by weight, zinc.

The active metallic hydroxide compound also contains, in some embodiments, at least about 50 percent (preferably at least 55 percent, more preferably between about 56 and 58 percent), by weight, nickel.

In some embodiments, the cell also contains a separator between the negative and positive electrodes, the separator having a thickness of between about 0.12 and 0.20 millimeters. Preferable separator materials include nonwoven fabrics containing polyolefin. The separator has, in some cases, an average pore size of between about 6 and 30 microns.

In some embodiments, the void volume of the separator is less than about 30 percent (preferably less than about 20 percent) of the sum of the void volumes of both electrodes and separator.

The active metallic hydroxide compound, in some embodiments, has an aggregate surface area of between about 10 and 30 square meters per gram (preferably about 15 square meters per gram). In one preferred configuration, the active metallic hydroxide compound is spheroidal, has a tap density (as defined by ASTM:D527-93) of between about 1.8 and 2.2 grams per cubic centimeter, and has a D101 crystallite plane spacing of less than about 100 angstroms.

In some embodiments, the negative electrode plate is U-shaped, having a central portion and two arms extending from the central portion on opposite sides of the positive electrode plate. The central portion of the U-shaped negative electrode plate may be welded to the housing.

In some embodiments, the ratios of the total capacities of both the positive and negative electrode plates, at a C/5 discharge rate, to the volume of the housing cavity each exceed about 100 ampere-hours per liter. Preferably, these ratios exceed about 150 ampere-hours per liter (more preferably about 250 ampere-hours per liter).

According to another aspect of the invention, the sealed electrochemical cell includes a prismatic housing defining an internal cavity, a negative electrode plate disposed within the housing cavity and in electrical communication with the housing, and only one positive electrode plate having only one, unitary, porous structure disposed within the housing cavity. The porous structure is electrically isolated from the housing and the negative electrode plate, and defines a principle direction of ion flow. The maximum linear dimension of the porous structure in the principle direction of ion flow is at least 15 percent of the maximum linear dimension of the housing cavity in the principle direction of ion flow.

According to another aspect of the invention, a miniature electrochemical cell is provided for use in portable electronic equipment. The cell has a prismatic housing defining an internal cavity with a volume of less than about 20 cubic centimeters, an outer electrode disposed within the housing cavity, and an inner electrode adjacent the outer electrode. The inner and outer electrodes together define a principle direction of ion flow, the inner electrode having a thickness of at least 1.0 millimeter in the principle direction of ion flow.

Some embodiments of the cell are constructed to produce a sustained electrical current of at least about 80 milliamperes (preferably, at least about 100 milliamperes, more preferably at least about 120 milliamperes) per square centimeter of the cross-sectional area of the inner electrode perpendicular to the principle direction of ion flow, at a voltage above about 1.0 volt.

In some configurations, the ratio of the total capacity of each of the anode and cathode to the volume of the housing cavity exceeds about 275 ampere-hours per liter.

According to another aspect of the invention, the sealed electrochemical cell has a prismatic housing with an internal cavity volume of less than about 20 cubic centimeters, the maximum linear dimension of the porous structure in the principle direction of ion flow being at least 20 percent of the maximum linear dimension of the housing cavity in the principle direction of ion flow.

According to yet another aspect, a nickel electrode plaque is provided for use in a nickel metal hydride electrochemical cell. The plaque contains a porous metallic substrate, and a metallic hydroxide compound disposed within the cavities of the substrate. The compound is of spherical powder form and contains at least 50 percent nickel in the form of nickel hydroxide. The plaque has a thickness of between about 0.5 and 3 millimeters, and a total volumetric capacity of at least 560 ampere-hours per liter.

According to yet another aspect, a metal hydride electrode plaque is provided for use in a nickel metal hydride electrochemical cell. The plaque contains a porous metallic substrate, and a nickel metal hydride compound disposed within the cavities of the substrate. The plaque has a thickness of between about 0.5 and 3 millimeters, and a total theoretical volumetric capacity of at least 1000 ampere-hour per liter.

Various aspects of the construction of the electrode and the cell together enable high internal current densities (and resulting discharge rates) while achieving very high capacity.

Various implementations of the invention may provide an electrochemical cell with a very low percentage of internal volume taken up by inactive materials, such as interconnecting tabs and multiple separator layers, leaving a high percentage of the internal volume for active material. The simple construction of the cell can also provide for efficient and inexpensive manufacture and assembly, which can result in minimal scrap and low cost. The invention can provide high energy densities, particularly for rechargeable applications which do not require extremely high discharge rates. In addition, the internally limited maximum discharge rate can help to protect the battery against overheating if externally shorted.

Other advantages and embodiments will be apparent from the following description of drawings, and from the claims.

BRIEF DESCRIPTION OF THE DRAWINGS

FIGS. 4A–4F sequentially illustrate the production of a positive electrode plaque.

FIGS. 5A–5D sequentially illustrate the production of a negative electrode plaque.

DESCRIPTION OF EMBODIMENTS

Figure 1:
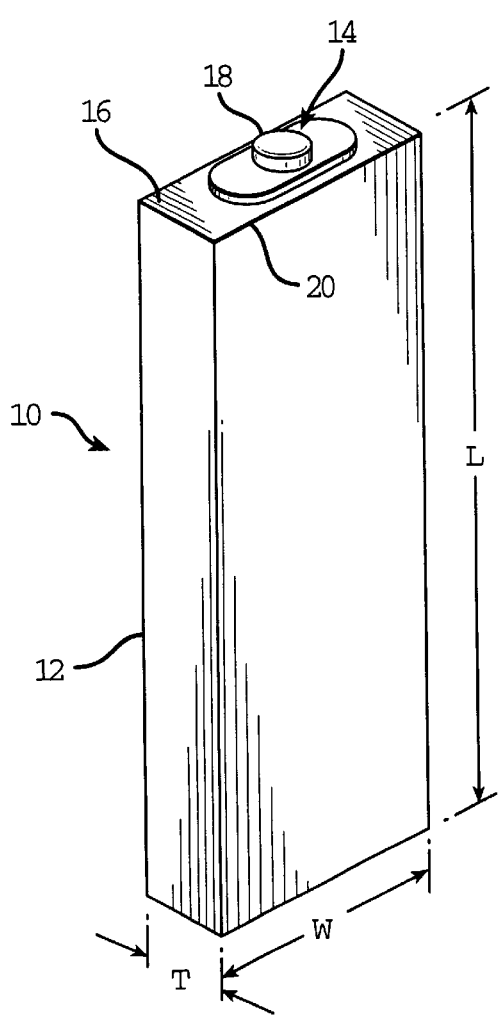
FIG. 1 is a perspective view of a prismatic electrochemical cell.

Referring to FIG. 1, a miniature prismatic nickel metal hydride rechargeable cell 10 has a rectangular can or housing 12 of nickel-plated cold rolled steel, stamped or deep drawn as known in the art. Cell 10 is of the F6 size used in some portable communications equipment, having an overall length, L, of between about 48 and 50 millimeters, a width, W, of between 15 and 16 millimeters, and an overall thickness, T, of about 5.6 millimeters. Because of its thinness, an array of such cells can be packaged in such devices as thin portable telephones and computer equipment. The thickness of cell 10 is preferably about 2 to 8 millimeters, more preferably between about 4 and 6 millimeters.

Figure 2:
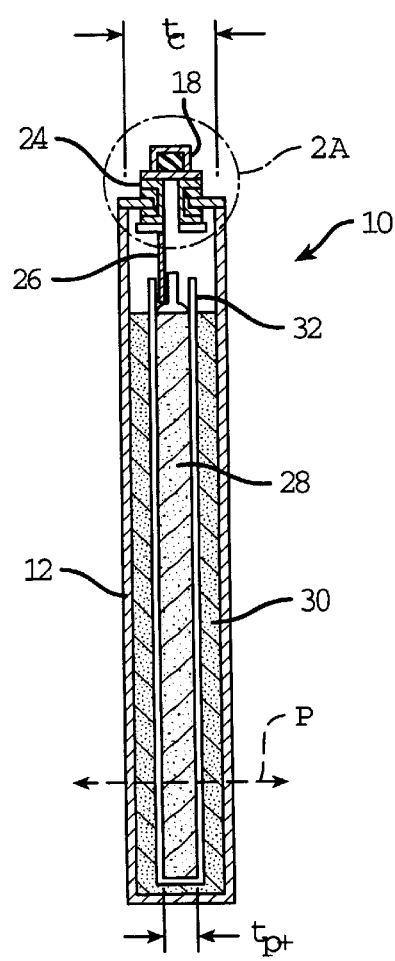
FIG. 2 is a section view of the cell of FIG. 1, showing one electrode configuration.

Referring also to FIG. 2, one end of housing 10 is solid, while the other is capped with a cap assembly 14 which includes a cap plate 16 and to which a contact button 18 is attached. Cap plate 16 is laser welded to can 12 along seam 20, such that the entire battery is sealed. The cavity within can 12 has an overall cavity thickness $t_c$ of about 4.6 millimeters. The principle direction of ion flow (i.e., the direction normal to the inter-electrode interface between opposing electrode surfaces) is indicated by arrow P.

Figure 2A:
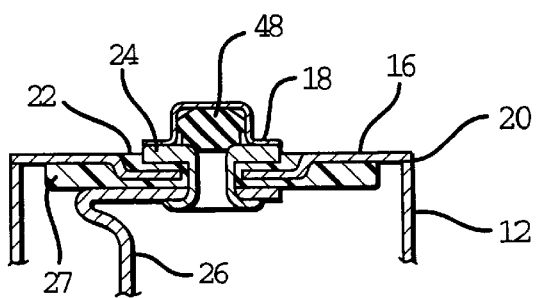
FIG. 2A is an enlarged view of area 2A in FIG. 2.

Referring also to FIG. 2A, contact button 18 is welded to a rivet 24 which is sealed to, and electrically isolated from, cap plate 16 by a nylon seal 22. Seal 22 sits within a recess in plate 16 and is held in place by rivet 24, which also retains a metal tab 26. Rivet 24 and tab 26 are electrically insulated from cap plate 16 by seal 22 and an interior insulator 27. Contact button 18 is in electrical contact with the positive electrode 28 of the cell through tab 26; the negative electrode 30 is in electrical contact with the walls of can 12. When an external electrical load is applied between button 12 and can 20, an internal flow of charged ions occurs between the positive and negative electrodes, and an external electric current is produced through the load.

Positive electrode 28 is electrically insulated from negative electrode 30 by a thin separator 32 in the form of a bag that encases the positive electrode. Separator 32 is made of a non-woven polyolefin material, and can be produced by either wet laid or dry laid methods known in the art of non-woven fabrics. Separator 32 is preferably surface treated to enhance its weatherability in aqueous electrolytes. The separator material is either wrapped around the positive electrode or formed into a tight, sealed bag to avoid electrical conduction between the positive electrode 28 and both the negative electrode 30 and the can 12.

Positive electrode 28 consists of a three-dimensional porous metallic substrate, such as a metallic foam or felt, which has been filled with an active material containing a metallic hydroxide compound in the form of a spherical powder. The active compound contains at least about 50 percent, by weight, nickel (preferably, more than about 55 percent, and more preferably between 56 and 58 percent) in the form of nickel hydroxide, into which cobalt and zinc have been coprecipitated to form part of the metal hydroxide lattice. The maximum linear dimension of the porous structure of the cathode is illustrated by dimension $t_{p+}$.

Figure 3:
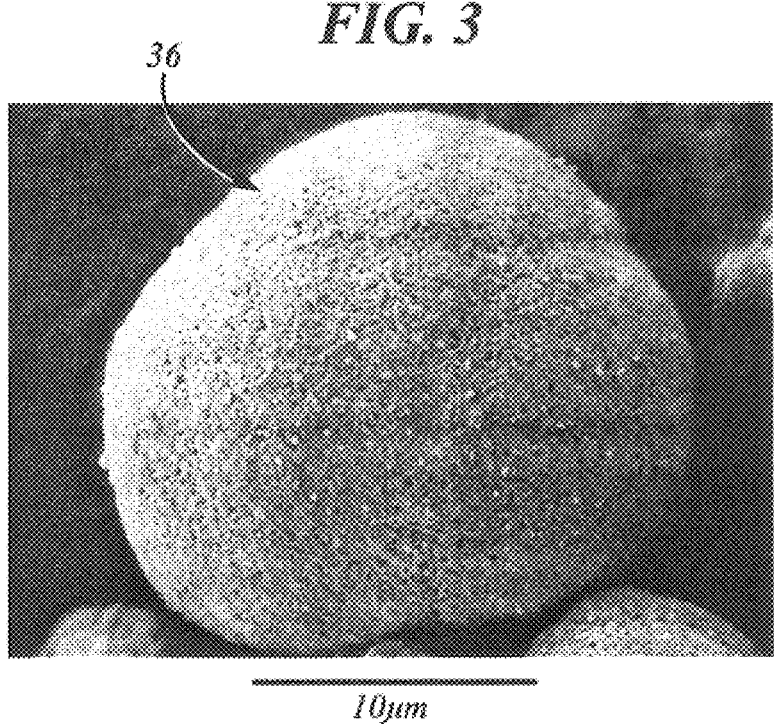
FIG. 3 is a view of spherical metal hydroxide alloy powder, enlarged 4000×.
Figure 3A:
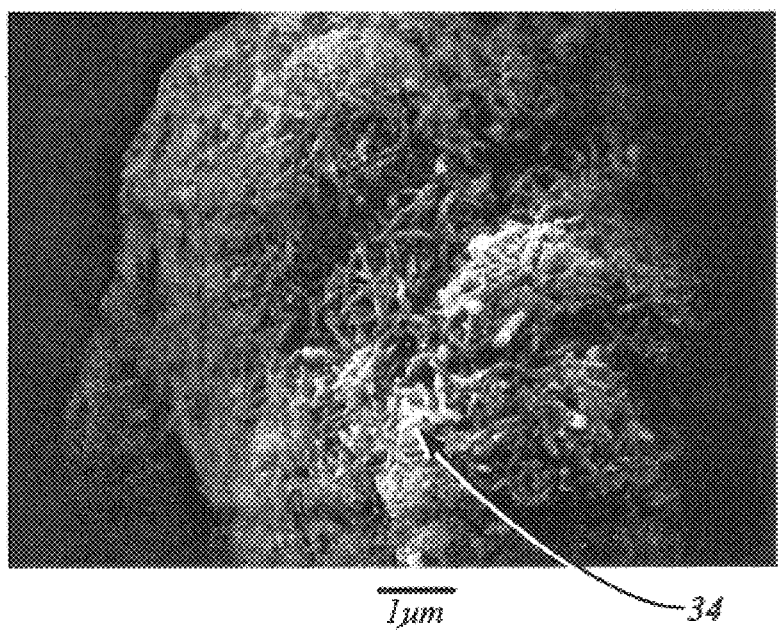
FIG. 3A is a view of the powder of FIG. 3, enlarged 10,000×.
Figure 3B:
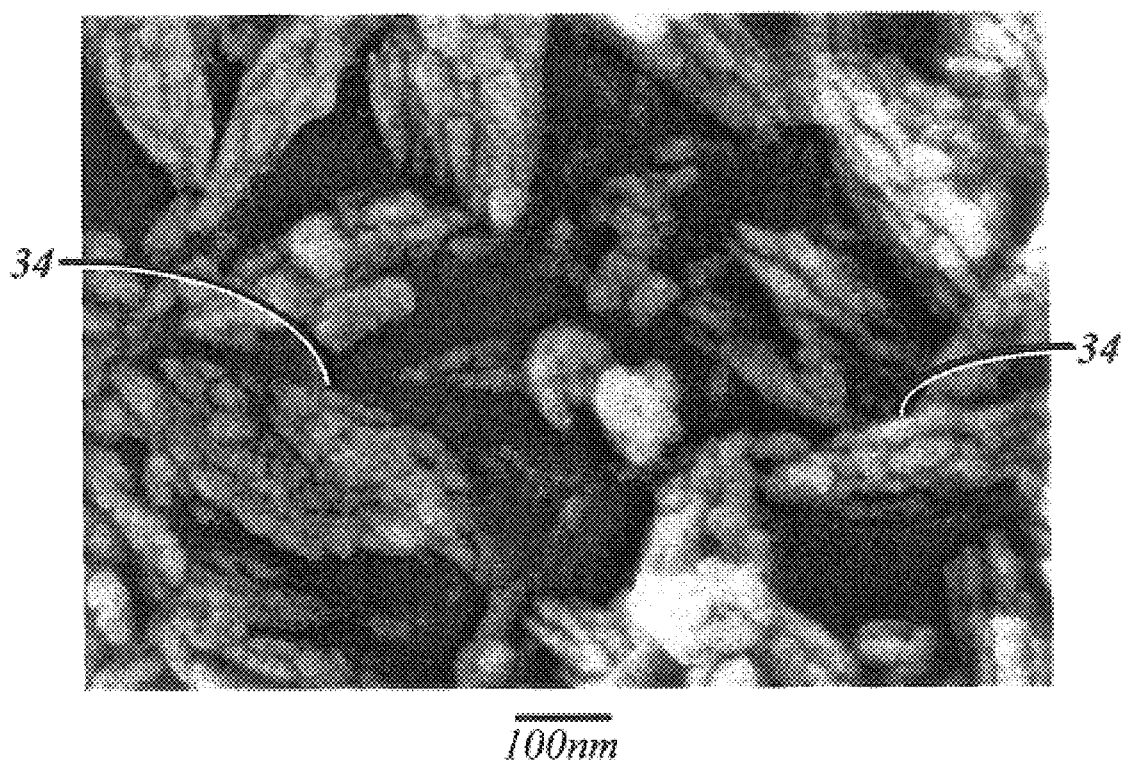
FIG. 3B is a view of the powder of FIG. 3, enlarged 100,000×.

Referring to FIGS. 3, 3A and 3B, the active material is specifically formulated to provide a high diffusion rate of hydrogen protons into and out of the spherical metal hydroxide powder. The metal hydroxide is in the form of small crystallites 34 that together form substantially spherical particles 36 with a mean particle diameter of about 10 to 15 microns and an aggregate surface area of about 14 square meters per gram. To reduce the required proton diffusion depth into the crystallites, the D101 crystallite plane spacing is held to less than about 100 angstroms. In addition, the metal hydroxide lattice contains from zero to about four percent, by weight, cobalt and from zero to eight percent, by weight, zinc. Increasing the cobalt in the hydroxide lattice beyond about four percent can reduce the discharge potential of the cell and can reduce overall capacity by displacing the nickel in the lattice. The addition of zinc helps to control the swelling of the nickel hydroxide during cycling by deterring the formation of low density gamma-phase nickel oxyhydroxide and the subsequent hydration of the hydroxide, which can consume water from the electrolyte and reduce capacity over time. Appropriate spherical metal hydroxide powders include TANAKA Chemical Type ZD, available from Sumitomo Corporation of America in Atlanta, Ga.

In addition to the cobalt in the active metallic hydroxide compound, the positive electrode contains cobalt in the form of cobalt oxide. Preferably, the weight of cobalt oxide in the positive electrode plaque is between about 0.03 and 0.10 times the weight of the active metallic hydroxide compound and is uniformly distributed among the hydroxide particles to minimize contact resistance during cycling. The mean particle size of the cobalt oxide is between about 0.5 and 2.5 microns. The cobalt oxide is preferably mixed with the metallic hydroxide, a binding agent, such as 0.3 to 0.7 percent, by weight, tetrafluoroethylene or a hydrocarbon binder, and 0.3 to 0.4 percent, by weight, thickening agent, such as carboxymethylcellulose (CMC) or sodium polyacrylate (SPA), before filling the electrode.

FIGS. 4A through 4F illustrate the production of the positive electrode 28 shown in FIG. 2. Before filling, the nickel foam substrate 38 of the electrode is preferably more than 90 percent porous, more preferably more than 96 percent porous, has a basis weight of between 500 and 600 grams per square meter, and is about 2.3 millimeters thick (FIG. 4A). The pore density of the metal foam is 80 to 110 pores per inch. In order to insure proper dry powder packing efficiency, the tap density of the metal hydroxide powder is between 1.8 and 2.2 grams per cubic centimeter. The powder is applied to the foam as an aqueous slurry, as known in the art. Once the metal foam is filled and the water removed by drying, the active material is removed from a narrow region 40 down the center of the plaque (FIG. 4B), such as by ultrasonic vibration with a flow of gas to remove the loosened powder, leaving region 40 essentially free of particulate matter. Region 40 is then reinforced with a 1.5 to 2.0 millimeter thick strip of cleared foam or felt, which is placed over region 40 prior to calendaring. The plaque is then calendared to a thickness of about 1.28 to 1.32 millimeters, trimmed to width, and scored along the center of cleared region 40 (FIG. 4C). The calendaring densities the plaque by removing excess space, and improves electrical contact between particles and between active material and substrate. In addition, the calendaring process coins center region 40, enhancing the contact between the substrate and the reinforcing strip, and producing a region of dense substrate metal. As calendared, the plaque has a total theoretical volumetric capacity, based on the amount of active material contained within it, of about 600 ampere-hours per liter. The calendared plaque is folded along the score line, such that the reinforcement strip is inside the fold, and the cleared metallic area is compressed to produce a highly densified edge 42 of clean nickel with a width $w_e$ of about 0.2 millimeters (FIG. 4D). After folding, the plaque is cut to form several individual electrode plaques of about 4 to 4.3 millimeters in length, about 1.45 millimeters in width (FIG. 4E) and of an overall thickness $t_{p+}$ of about 2.60 to 2.66 millimeters (FIG. 2). To help insure that there is no blockage of the vent in the assembled cell, a center notch 44 is cut into the cleared edge of the final plaque (FIG. 4F).

FIGS. 5A through 5D illustrate the formation of negative electrode 30 (FIG. 2). A porous nickel foam or felt substrate 44 of about 2 millimeters thickness and a basis weight of about 400 to 550 grams/square centimeter (FIG. 5A) is filled with an active nickel metal hydride alloy powder and a high surface area carbon, preferably as an aqueous slurry. The carbon enhances the conductivity of the electrode, and helps in the recombination of oxygen during overcharge. As described above with reference to the positive electrode, a PTFE binder and CMC or SPA thickening agents are added to enhance processability. After drying the filled plaque, the added materials are removed from a 3 to 5 millimeter wide center portion 46 of the plaque (FIG. 5B). Clearing center portion 46 helps to help prevent cracking the negative electrode as it is bent about the positive electrode. Such cracking can result in electrical discontinuity. Optionally, a separate strip of empty nickel foam can be added to center portion 46 to enhance its strength and conductivity. The filled plaque is then densified by calendaring to a thickness of about 0.9 to 0.95 millimeters, and cut into several individual negative electrode plaques sized to fit within the battery housing (FIG. 5C). As calendared, the plaques have a total theoretical volumetric capacity, based on the amount of active material contained within them, of about 1190 ampere-hours per liter. Each final negative electrode plaque has a width $w_{p-}$ of about 1.5 millimeters and a total length $L_{p-}$ of about 8.2 to 8.7 millimeters. The finished negative electrode can either be wrapped around the positive electrode prior to insertion into the can or it can be bent and pressure-fit into can 12 by itself. During cycling, the thickness of the stack of electrodes increases slightly due to swelling, thus reducing the contact resistance with the can. Optionally, the center portion of the negative electrode may be welded, such as by resistance or laser welding, to the bottom of the can (FIG. 5D) to increase conductivity.

Referring back to FIG. 2, with negative electrode 30 assembled into can 12, positive electrode 28 is welded to tab 26 of cap assembly 14 (before attaching contact button 18), surrounded by separator bag 32, and inserted into can 12 between the opposing sides of positive electrode 30. Cap assembly 14 is then laser welded to can 12 about seam 20 (FIG. 1).

After welding the cap assembly to the can, about 1.2 to 1.3 cubic centimeters of electrolyte is added to the cell, by a vacuum filling process, through a hole through rivet 24 of the cap assembly. The electrolyte is primarily a potassium hydroxide alkaline salt dissolved in distilled, de-ionized water. Optionally, small amounts of lithium hydroxide and/ or sodium hydroxide may also be added. Just enough electrolyte is added to fill the remaining voids in the electrode plaques and the separator, and to account for the hydration of the cobalt in the positive electrode (i.e., the cell is of the "starved" type). A rubber, resealable pressure vent 48 is placed inside contact button 18, which is then welded onto the base of rivet 24 to complete the sealing of the cell.

A notable feature of cell 10 is the above-described construction and arrangement of electrodes 28 and 30, which enables a very high proportion of the internal volume of the cell to be used for active materials. The thickness of each electrode plaque is a high percentage of the overall cavity thickness $t_c$ of the cell, thereby reducing the need for inactive materials such as separators and tabs. For instance, the ratio of the thickness of the center electrode to the cavity thickness is about 0.55, and the ratio of the thickness of the outer electrode to the cavity thickness is about 0.2. In addition, the negative to positive capacity ratio is only between 1.35 to 1.45 (preferably about 1.4). This lower capacity ratio enables an increase in overall capacity and energy density while providing sufficient excess metal hydride to avoid excessive pressure during overcharge. The resulting cell is especially suitable for use in applications in which capacity is determined to be a more significant motivation than cycle life in excess of 200 full discharge cycles at room temperature.

The construction of the electrode plaques helps to reduce the diffusion polarization effects that would be expected with such a thick electrode design. For instance, the final porosity of both electrode plaques, after filling and calendaring, is between about 35 and 40 percent. This, combined with the thinness of separator 32, means that a significant portion of the electrolyte is contained within the electrode plaques, enhancing proton diffusion at the surface of the active material particles. Only about 18 percent of the electrolyte is contained within the separator, with the other 82 percent contained within the electrodes, as calculated by the ratio of their void volumes. In addition, the crystallite structure of the active material, discussed above with reference to FIG. 3, helps to enhance proton diffusion. The resulting high diffusivity enables higher current densities with thick electrode plaques and without unacceptable voltage drops, thus permitting higher net currents to be produced from a cell with a relatively small amount of interfacial surface area. For example, the cell embodiment discussed above has an energy density (i.e., minimum ratio of electrode capacity to cavity volume) of about 330 watt-hours per liter of internal cell volume, and is capable of generating a current density of more than about 50 milliamperes per square centimeter of interfacial area at a voltage above one volt, with a central electrode thickness of about 2.6 millimeters. In terms of gravimetric energy density, the cell is capable of producing about 62 watt-hours per kilogram of cell mass.

Figure 6A:
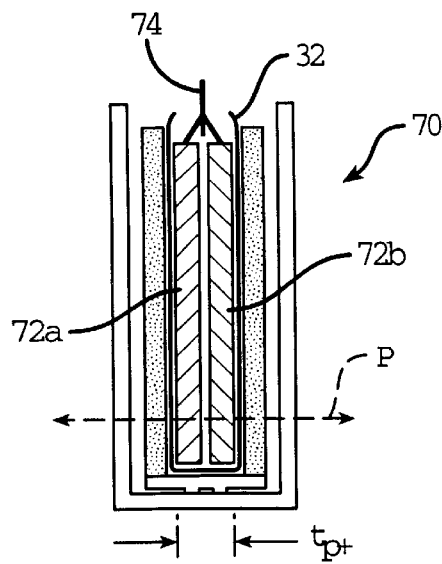
FIGS. 6A–6C illustrate other electrode configurations.
Figure 6B:
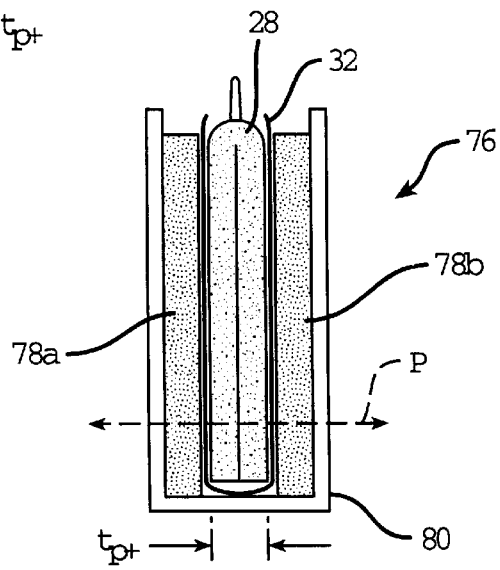

Cell 10 of FIG. 2 has a one-piece positive electrode 28 and a one-piece negative electrode 30. Some other configurations are illustrated in FIGS. 6A and 6B. For instance, the positive electrode of cell 70 in FIG. 6A consists of two separately-formed plaques 72a and 72b, which are each welded to a common tab 74. This configuration may be useful to avoid clearing and folding the center electrode. In FIG. 6B, cell 76 has two separate negative electrode plaques 78a and 78b, each in electrical contact with can 80. In another embodiment (not shown), the two-piece positive electrode configuration of FIG. 6A is combined with the two-piece negative electrode configuration of FIG. 6B. In yet other embodiments, the negative (metal hydride) electrode is placed at the center of the cell, and the positive (nickel) electrode is positioned near the walls of the can, although the negative electrode/can interface of the cell of FIG. 2 provides additional area for gas recombination during overcharge. A positive electrode configured to be the outer electrode would preferably be about one-half the thickness of the same electrode configured to be the inner electrode. With the addition of a layer of electrically insulating material between the can and the outer electrode, the electrode at the center of the cell can be in electrical communication with the can.

Figure 6C:
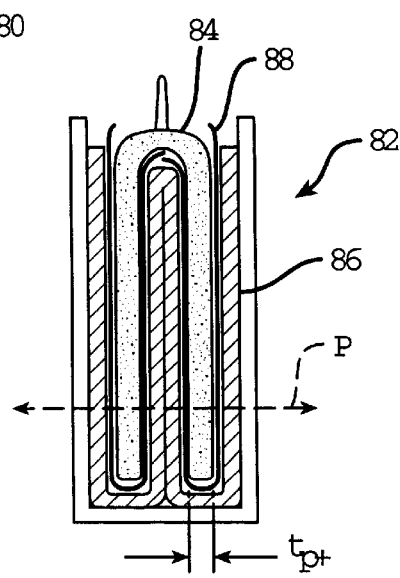

FIG. 6C illustrates another embodiment of a cell 82 with a one-piece, thick inner electrode 84 and a one-piece, thick outer electrode 86, folded to overlap each other to increase interfacial area between the electrodes. In cell 82, inner electrode 84 is U-shaped, and outer electrode 86 is W-shaped, with the two arms of inner electrode 84 extending into the two pockets formed by outer electrode 86. Each arm of the inner electrode is contained within a separator bag 88 to electrically insulate one electrode from the other. Alternatively, a single separator sheet, wider than the inner electrode, can be folded around the inner electrode to insulate it from the outer electrode and can. Compared to the configurations of FIGS. 6A and 6B, this electrode configuration enables a higher discharge rate capability, while having minimal impact on the overall capacity of the cell.

The principle direction of ion flow between the electrodes is indicated by arrow P in FIGS. 2 and 6A–6C. This direction is normal to the inter-electrode interface between opposing electrode surfaces. In all of the embodiments illustrated, this principle direction of ion flow is normal to the broadest faces of the can. The maximum linear dimension of the porous structure of the cathode, in each case, is illustrated by dimension $t_{p+}$.

Other embodiments and features are also within the scope of the following claims.

What is claimed is:

1. A sealed metal hydride electrochemical cell, comprising a prismatic housing defining a cavity therein;

a negative electrode plate disposed within the housing cavity, adjacent to the housing, and in electrical communication with the housing; and a positive electrode plate comprising a porous structure disposed within the housing cavity, the porous structure electrically isolated from the housing and the negative electrode plate and defining a principle direction of ion flow;

the maximum linear dimension of the porous structure in the principle direction of ion flow being at least 20 percent of the maximum linear dimension of the housing cavity in the principle direction of ion flow.

2. The cell of claim 1 wherein the maximum linear dimension of the porous structure in the principle direction of ion flow is at least 30 percent of the maximum linear dimension of the housing cavity in the principle direction of ion flow.

3. The cell of claim 1 wherein the maximum linear dimension of the porous structure in the principle direction of ion flow is at least 40 percent of the maximum linear dimension of the housing cavity in the principle direction of ion flow.

4. The cell of claim 1 wherein the maximum linear dimension of the porous structure in the principle direction of ion flow is between 52 and 56 percent of the maximum linear dimension of the housing cavity in the principle direction of ion flow.

5. The cell of claim 1 wherein the housing has an overall external dimension, measured in the principle direction of ion flow, of between about 2 and 8 millimeters.

6. The cell of claim 5 wherein said overall external dimension is between about 4 and 6 millimeters.

7. The cell of claim 6 wherein said overall external dimension is about 5.6 millimeters.

8. The cell of claim 1 wherein the porosity of the porous structure of the positive electrode plate is between about 30 and 40 percent.

9. The cell of claim 8 wherein the porosity of the porous structure of the positive electrode plate is between about 34 and 36 percent.

10. The cell of claim 1 wherein the positive electrode plate comprises an active metallic hydroxide compound comprising nickel and from zero to about four percent, by weight, cobalt.

11. The cell of claim 10 wherein the active metallic hydroxide compound comprises about two percent, by weight, cobalt.

12. The cell of claim 11 wherein the active metallic hydroxide compound comprises about 0.5 percent, by weight, cobalt.

13. The cell of claim 10 wherein the cobalt is in the form of cobalt oxide, the weight of the cobalt oxide being between about 0.03 and 0.10 times the weight of the active metallic hydroxide compound.

14. The cell of claim 10 wherein the active metallic hydroxide compound further comprises from zero to about eight percent, by weight, zinc.

15. The cell of claim 14 wherein the active metallic hydroxide compound comprises between about 4 and 6 percent, by weight, zinc.

16. The cell of claim 15 wherein the active metallic hydroxide compound comprises about 5 percent, by weight, zinc.

17. The cell of claim 10 wherein the active metallic hydroxide compound comprises at least about 50 percent, by weight, nickel.

18. The cell of claim 17 wherein the active metallic hydroxide compound comprises at least about 55 percent, by weight, nickel.

19. The cell of claim 18 wherein the active metallic hydroxide compound comprises between about 56 and 58 percent, by weight, nickel.

20. The cell of claim 1 further comprising a separator disposed between the negative and positive electrodes, the separator having a thickness of between about 0.12 and 0.20 millimeters.

21. The cell of claim 20 wherein the separator comprises a nonwoven fabric containing polyolefin.

22. The cell of claim 20 wherein the separator has an average pore size of between about 6 and 30 microns.

23. The cell of claim 10 wherein the positive electrode, the negative electrode and the separator each have a corresponding void volume, the void volume of the separator being less than about 30 percent of the sum of the void volumes of both electrodes and separator.

24. The cell of claim 23 wherein the void volume of the separator being less than about 20 percent of the sum of the void volumes of both electrodes and separator.

25. The cell of claim 10 wherein the active metallic hydroxide compound has an aggregate surface area of between about 10 and 30 square meters per gram.

26. The cell of claim 25 wherein the active metallic hydroxide compound has an aggregate surface area of about 15 square meters per gram.

27. The cell of claim 25 wherein the active metallic hydroxide compound is spheroidal.

28. The cell of claim 25 wherein the active metallic hydroxide compound has a tap density of between about 1.8 and 2.2 grams per cubic centimeter.

29. The cell of claim 25 wherein the active metallic hydroxide compound has a D101 crystallite plane spacing of less than about 100 angstroms.

30. The cell of claim 1 wherein the negative electrode plate is U-shaped, having a central portion and two arms extending from the central portion on opposite sides of the positive electrode plate.

31. The cell of claim 30 wherein the central portion of the negative electrode plate is welded to the housing.

32. The cell of claim 1 wherein the ratios of the total capacities of both the positive and negative electrode plates, at a C/5 discharge rate, to the volume of the housing cavity each exceed about 100 ampere-hours per liter.

33. The cell of claim 32 wherein said ratios exceed about 150 ampere-hours per liter.

34. The cell of claim 33 wherein said ratios exceed about 250 ampere-hours per liter.

35. A sealed metal hydride electrochemical cell, comprising
  a prismatic housing defining a cavity therein;
  a negative electrode plate disposed within the housing cavity, adjacent to the housing, and in electrical communication with the housing; and
  only one positive electrode plate comprising only one, unitary, porous structure disposed within the housing cavity, the porous structure electrically isolated from the housing and the negative electrode plate and defining a principle direction of ion flow;
  the maximum linear dimension of the porous structure in the principle direction of ion flow being at least 15 percent of the maximum linear dimension of the housing cavity in the principle direction of ion flow.

36. A miniature metal hydride electrochemical cell for use in portable electronic equipment, the cell comprising
  a prismatic housing defining an internal cavity with a volume of less than about 20 cubic centimeters;
  an outer electrode disposed within the housing cavity; and
  an inner electrode adjacent the outer electrode, the inner and outer electrodes together defining a principle direction of ion flow;
  the inner electrode having a thickness of at least 1.0 millimeter in the principle direction of ion flow.

37. The electrochemical cell of claim 36 wherein the inner electrode has a cross-sectional area perpendicular to the principle direction of ion flow, the cell constructed to produce a sustained electrical current of at least about 80 milliamperes per square centimeter of said cross-sectional area of the inner electrode at a voltage above about 1.0 volt.

38. The electrochemical cell of claim 37 constructed to produce a sustained electrical current of at least about 100 milliamperes per square centimeter of said cross-sectional area of the inner electrode at a voltage above about 1.0 volt.

39. The electrochemical cell of claim 38 constructed to produce a sustained electrical current of at least about 120 milliamperes per square centimeter of said cross-sectional area of the inner electrode at a voltage above about 1.0 volt.

40. The cell of claim 36 wherein the ratio of the total capacity of each of the anode and cathode to the volume of the housing cavity exceeds about 275 ampere-hours per liter.

41. A sealed metal hydride electrochemical cell, comprising
  a prismatic housing defining a cavity therein the cavity having a volume of less than about 20 cubic centimeters;
  a negative electrode plate disposed within the housing cavity and in electrical communication with the housing; and
  a positive electrode plate comprising a porous structure disposed within the housing cavity, the porous structure electrically isolated from the housing and the negative electrode plate and defining a principle direction of ion flow;
  the maximum linear dimension of the porous structure in the principle direction of ion flow being at least 20 percent of the maximum linear dimension of the housing cavity in the principle direction of ion flow.

42. A sealed metal hydride electrochemical cell, comprising:
  a nickel electrode plaque comprising
    a porous metallic substrate defining cavities therein; and
    a metallic hydroxide compound disposed within the cavities of the substrate, the compound being of spherical powder form and comprising at least 50 percent nickel in the form of nickel hydroxide;
  the plaque having a thickness of between about 0.5 and 3 millimeters and a total volumetric capacity of at least 560 ampere-hours per liter.

43. A seal metal hydride electrochemical cell, comprising:
  a metal hydride electrode plaque comprising
    a porous metallic substrate defining cavities therein; and
    a nickel metal hydride compound disposed within the cavities of the substrate;
  the plaque having a thickness of between about 0.5 and 3 millimeters and a total theoretical volumetric capacity of at least 1000 ampere-hour per liter.

* * * * *